United States Patent
Schewitz

(10) Patent No.: US 7,520,392 B2
(45) Date of Patent: Apr. 21, 2009

(54) SUPPORT STRUCTURE FOR HOLDING FILTER MEDIUM

(75) Inventor: Jonathan Schewitz, East London (ZA)

(73) Assignee: Jonathan Schewitz Trust, Eastern Cape Province (ZA)

( * ) Notice: Subject to any disclaimer, the term of this patent is extended or adjusted under 35 U.S.C. 154(b) by 118 days.

(21) Appl. No.: 10/512,881

(22) PCT Filed: Apr. 29, 2002

(86) PCT No.: PCT/IB02/01430

§ 371 (c)(1),
(2), (4) Date: Oct. 28, 2004

(87) PCT Pub. No.: WO03/092856

PCT Pub. Date: Nov. 13, 2003

(65) Prior Publication Data

US 2005/0155924 A1    Jul. 21, 2005

(51) Int. Cl.
*B01D 29/31* (2006.01)
*B01D 29/11* (2006.01)
*B01D 29/13* (2006.01)
*B01D 29/15* (2006.01)
*B01D 29/17* (2006.01)
*B01D 29/33* (2006.01)
*B01D 29/50* (2006.01)
*B01D 29/52* (2006.01)

(52) U.S. Cl. ............ 210/483; 210/232; 210/317; 210/323.2; 210/346; 210/347; 210/455

(58) Field of Classification Search ........ 210/497.01, 210/495, 484, 483, 445, 435, 346, 323.2, 210/330; 55/529, 528, 524, 492, 486, 381, 55/379, 378; *B01D 29/25*

See application file for complete search history.

(56) References Cited

U.S. PATENT DOCUMENTS

| 2,028,062 A | * | 1/1936 | Goldman .............. 210/440 |
| 3,503,516 A | * | 3/1970 | Harms et al. ........... 210/323.2 |
| 4,654,143 A |   | 3/1987 | Drori |
| 5,308,485 A | * | 5/1994 | Griffin et al. .......... 210/232 |

(Continued)

FOREIGN PATENT DOCUMENTS

GB    1324299    7/1973

*Primary Examiner*—Krishnan S Menon
*Assistant Examiner*—Benjamin Kurtz
(74) *Attorney, Agent, or Firm*—Meyertons, Hood, Kivlin, Kowert & Goetzel. P.C.; Eric B. Meyertons

(57) ABSTRACT

A liquid filter element frame (7) is provided comprising an elongate injection moulded body, conveniently composed of a series of collinear injection moulded units (13). The frame has a plurality of support ribs (14) radiating from a central axis thereof and a support collar (17) encircling the outer edges of the ribs at the operatively upper end. The collar has formed integral therewith a plurality of radially inwardly directed support rails (18) having inner ends cooperating with the moulded body between adjacent support ribs thereof. Preferably, the collar has a number of inwardly extending support rails equal to the number of radially extending support ribs with the inner edges (19) of the support rails being received neatly in a corner formed between each pair of adjacent support ribs. The invention also provides a liquid filter including filter elements having such frames.

10 Claims, 3 Drawing Sheets

U.S. PATENT DOCUMENTS 5,736,045 A * 4/1998 Bies et al. .............. 210/497.01
6,401,938 B1 6/2002 Schewitz
6,706,085 B2 * 3/2004 Gerakios et al. .............. 55/378

* cited by examiner

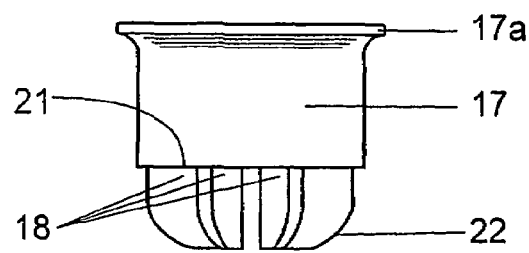
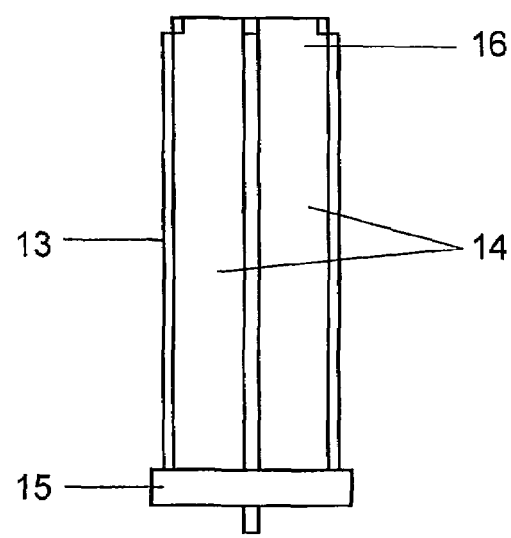
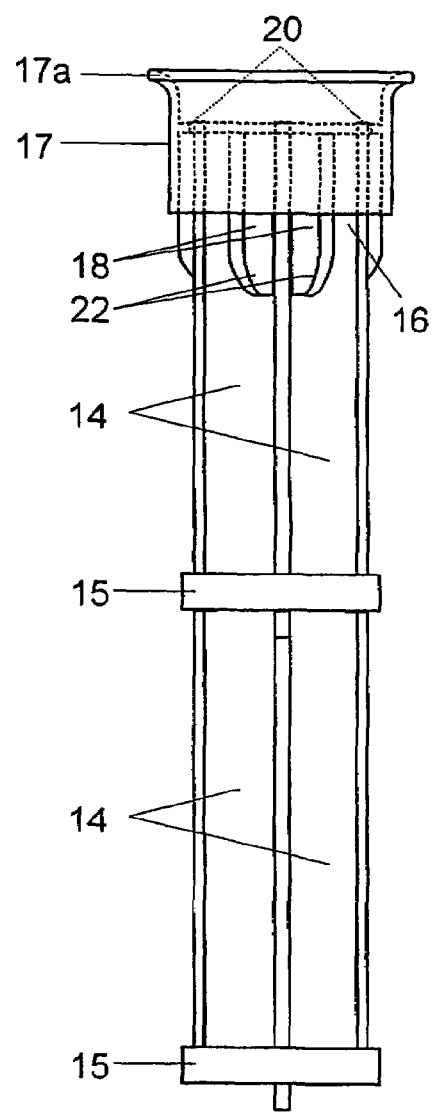
Figure 3
Figure 4
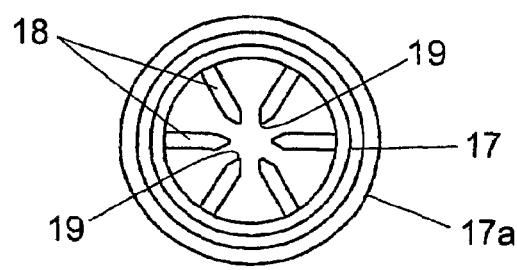
Figure 5
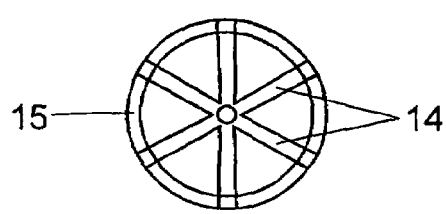
Figure 6
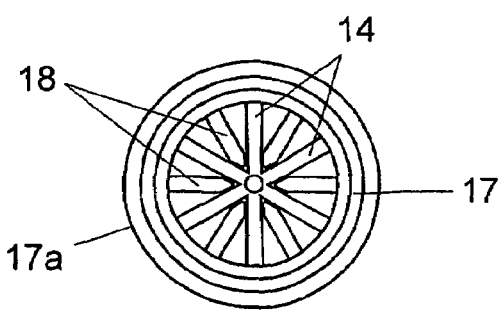
Figure 7

SUPPORT STRUCTURE FOR HOLDING FILTER MEDIUM

FIELD OF THE INVENTION

This invention relates to a filter element for a liquid filter of the type employing a filter medium, such as a fabric bag or sleeve through which liquid is to pass in order to effect filtration, and wherein a filtration aid such as diatomaceous earth is generally used to form a layer on the outside of the filter medium during operation of the filter. During operation, dirt becomes deposited on the layer of filtration aid, rather than directly on the filter medium.

More particularly, the invention relates to a filter element of the type comprising a support frame adapted to be covered by a fabric bag or sleeve as well as to a liquid filter including at least one, and generally a series of such filter elements.

BACKGROUND TO THE INVENTION

Filters that employ a filter medium, generally in combination with a filtration aid in order to avoid premature blinding of the filter medium and thereby to extend the cycle time between back washing procedures, generally operate on the principle that when the filter is turned off, the filtration aid and dirt collected thereby fall to the bottom of the container. When the filter is started up again, inlet fluid serves to stir up the filtration aid usually together with at least some dirt from the bottom of the filter container so that the filter aid becomes coated on to the filter medium once more.

One type of filter that has proved to be highly successful is that described in my issued South African Patents Nos 93/0761 and 2001/2144. This type of filter utilises a series of generally parallel elongate filter elements that have a plastics injection moulded frame having, in cross-section, a number of longitudinally extending ribs radiating from a central axis and the outer edges of which support the fabric sleeve. The construction of the frame is dictated, to some extent, by the tool design and, as a consequence, the operatively upper end of each frame has heretofore been fitted with a moulded collar encircling the upper end of the frame and having a flange that serves to support the downwardly extending filter element in its operative position relative to a divider plate that supports the filter elements in a generally vertical orientation.

This construction, whilst being substantially successful, has proved to result, in some cases, in the possibility of stresses caused by forces exerted on the filter elements, in particular during start-up, leading to failure of the frame in the region of its upper end, and in particular at the collar. This results from the fact that the upper end is the sole support region of the filter element in use.

In addition, if the fabric bag or sleeve is not held adequately tightly over the upper end of the frame, the fabric of the sleeve can be pushed in, by liquid pressure, to the flow path between the radiating ribs and collar with a consequent decrease in flow from the interior of the relevant filter element and an accompanying decrease in filtration efficiency.

OBJECT OF THE INVENTION

It is accordingly an object of this invention to provide a filter element frame that is adapted to strengthen the support of the frame at its upper end and also, optionally, to diminish the likelihood of the fabric of the bag or sleeve being pushed into the flow path past the collar edge.

SUMMARY OF THE INVENTION

In accordance with this invention there is provided a liquid filter element frame comprising an elongate injection moulded body having a plurality of support ribs radiating from a central axis thereof and a support collar encircling the outer edges of the ribs at the operatively upper end thereof, the frame being characterised in that the collar has formed integral therewith a plurality of radially inwardly directed support rails having inner ends cooperating with the moulded body between adjacent support ribs thereof.

Further features of the invention provide for the moulded body to comprise a plurality, typically six, radiating support ribs in which case the collar has an equal number of inwardly extending support rails the inner edges of which are received neatly in a corner formed between each pair of adjacent support ribs; for the support rails to be flat in general construction with a tapered inner edge for neat accommodation in the corner between an associated pair of support ribs; for the support rails to extend downwards beyond the operatively lower end of the collar; for the operatively outer edges of the lower ends of the support rails to curve inwards towards the centre thereof; and for the operatively upper end of the collar to have an integral outwardly directed support flange.

Preferably, the elongate injection moulded body consists of a series of collinear injection moulded units each having an integral support ring interconnecting the outer edges of the support ribs at the operatively lower end thereof and an operatively upper end that, in the case of all but the uppermost unit, receives the lower edge of the support ring of the super-jacent unit. In such a case the operatively uppermost unit receives the collar of this invention with its integral support rails and support flange at its upper end. The collar is bonded to the uppermost unit by any suitable means such as ultrasonic welding or, more conveniently, utilizing solvent welding or a suitable adhesive combined with a tight fit of the collar on the element.

The invention also provides filter elements including a filter element frame as defined above as well as a liquid filter including such filter elements.

In order that the invention may be more fully understood one embodiment thereof will now be described with reference to the accompanying drawings.

BRIEF DESCRIPTION OF THE DRAWINGS

In the drawings:

FIG. 3 is a similar but enlarged exploded view of the operatively upper end of the filter element frame;

FIG. 4 is a similar elevation showing the collar in the installed position on the uppermost unit and showing also the next unit down;

FIG. 5 is an end view of the collar alone;

FIG. 6 is an end view of an injection moulded frame unit from the operatively upper end thereof;

FIG. 7 is an end view of the collar in the installed position on the upper end of the associated frame unit; and, FIG. 8 is a partly sectioned elevation of the operatively lower end of a filter element.

DETAILED DESCRIPTION WITH REFERENCE TO THE DRAWINGS

Figure 1:
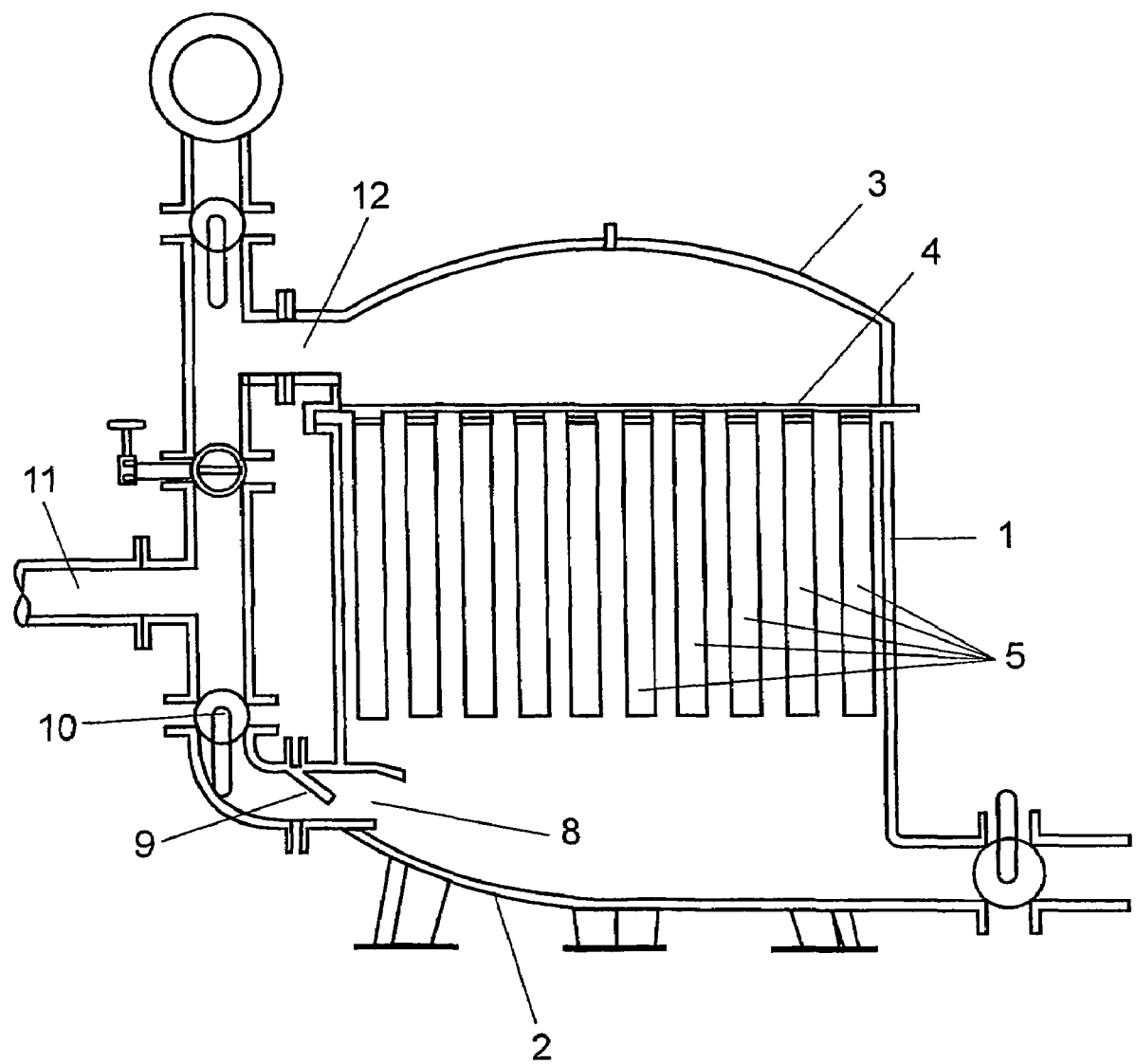
FIG. 1 is a schematic sectional elevation of a liquid filter assembly of the type in which the expedient of the invention is embodied.

The type of liquid filter assembly with which this invention is concerned typically comprises a container (1) of a circular cylindrical shape and having a concave lower end (2) and a correspondingly convex lid (3) removably secured thereto. Towards the upper end of the container is a transverse, generally horizontal, divider plate (4) which supports the upper ends of an array of generally vertical elongate filter elements (5) each of which has a filter medium in the form of a fabric sleeve (6) supported on a supporting frame (7) therefor.

Located in the side wall of the container towards the bottom thereof is an inlet (8) fitted with a one way non-return valve (9) and connected through a control valve (10) to an inlet connection (11) for the liquid to be filtered.

The upper end of the container has an outlet (12) for filtered liquid through the side wall thereof located above the level of the dividing wall (4).

In use, liquid enters through the inlet (8); passes through the fabric filter medium of the sleeves; and thence up the filter elements (5); into the upper region of the container (1) on the opposite and thus upper side of the dividing wall (4); and out through the outlet (12). In the type of filter under consideration the fabric filter medium supports, in the operative condition, a finely subdivided filtration aid that is typically diatomaceous earth.

At the end of a filtration cycle the diatomaceous earth and the dirt that has been trapped thereby fall to the bottom of the container and must be stirred up in a substantially even manner when the filter is next started up.

It will be understood that the elongate filter elements, being supported only at their upper ends, are subjected to certain stresses and strains particularly during start-up and that the operatively upper end of the elements must accept the force that is applied to the elements.

The frame (7) is elongate and is made up of a series of collinear injection moulded units (13) shown most clearly in FIG. 3 and each of which has, in cross-section, six radiating support ribs (14) the outer edges of which support the sleeve (6). The support ribs (14) are interconnected at their outer edges by a ring (15) at one end, the operatively lower end thereof, with the ring encircling the ribs and being moulded integral therewith. The operatively lower end of the composite frame terminates in such a ring (15a) (see FIG. 8).

As provided by this invention the operatively upper end (16) of the uppermost frame unit (13) is fitted with a collar (17) that has integral, equally angularly spaced, inwardly directed support rails (18). The support rails have convergent innermost edges (19) that are made to fit tightly between the innermost ends of the support ribs (14) so that each support rail is offset angularly by 30 degrees to each of the two adjacent support ribs of the injection moulded frame unit. As shown in FIG. 4, the collar has an internal flange (20) against which the upper end of the injection moulded unit abuts in the installed position.

The support rails extend appreciably below the lower end (21) of the collar, as indicated by numeral (22), so that a strong mounting for the operatively upper end of each filter element frame is provided.

The collar also has an integral outwardly directed support flange (17a) at its upper end.

The collar units are also injection moulded from plastics material and are permanently secured to the upper end of the associated injection moulded frame unit by any suitable means such as solvent welding or other bonding agent or, alternatively, by ultrasonic welding. In any event the collar unit is made a tight fit onto the end of the injection moulded frame unit so that no play is possible between the two parts in the operative condition.

Figure 8:
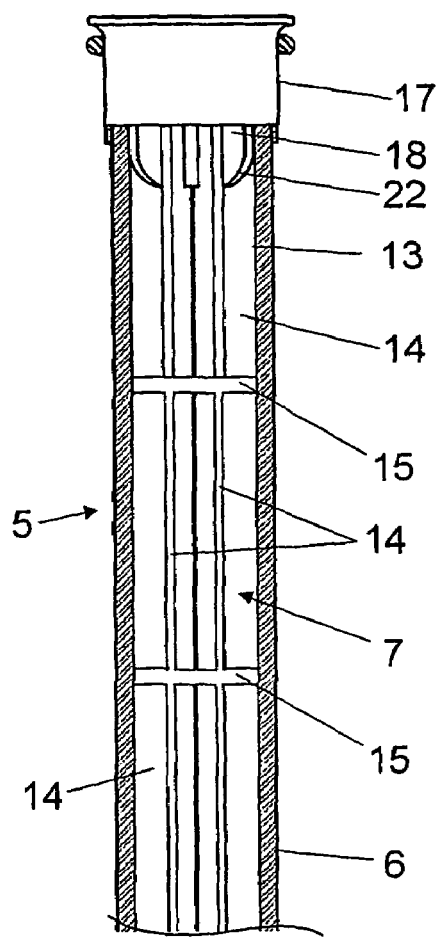
Figure 8:
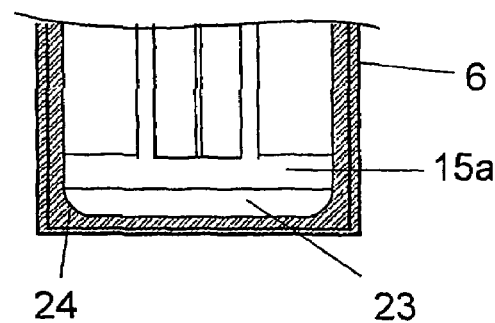
Figure 2:
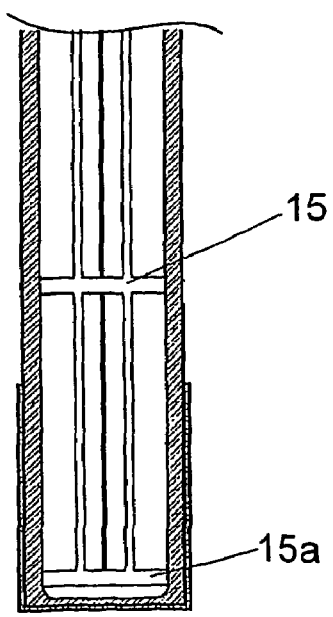
FIG. 2 is a general schematic sectional elevation of one filter element having a frame composed of a series of collinear plastics injection moulded units the uppermost one of which is fitted with a collar according to the invention.

The filter element frame is finished at the operatively lower end utilizing a disc (23) made of injection moulded plastics material and having a rounded edge (24) as shown in FIG. 8 and as more fully described in my granted South African patent No 2000/2145 the disclosure of which is incorporated herein by reference.

It will be understood that the radially extending support rails that engage the operatively upper end of the support frame of the filter element form an extremely firm and robust attachment for the frame to the divider plate and, according to tests conducted the date, the collar of this invention exhibits appreciably superior strength over previous attachment collars used heretofore. Also, the arrangement of the support rails extending below the lower edge of the collar itself is effective to prevent any filter fabric that may be loose from being pushed by liquid under pressure into the flow passages through the collar and thereby at least partially blocking them.

It will be understood that numerous variations may be made to the embodiment of the invention described above without departing from the scope hereof. In particular, it may be found adequate to provide, for example, only three inwardly directed support rails in the case of six support ribs on the filter element frame unit itself although the remaining three apertures may be subject to drawing filter fabric into them in the event that it is too loose.

The invention claimed is:

1. A liquid filter element frame for supporting a filter bag on the outside thereof, comprising an elongate injection molded body having an operatively upper end and an operatively lower end, a plurality of support ribs radiating from a central axis of the body and terminating radially at outer edges of the body, and wherein a separately injection molded support collar having an upper end and a lower end encircles the outer edges of the ribs at the operatively upper end of the molded body, and wherein further the collar has formed integral therewith a plurality of radially inwardly directed support rails having inner ends cooperating with the molded body between adjacent support ribs thereof and wherein the inner end of each support rail is received neatly in a corner formed between a pair of adjacent support ribs of the body.

2. A liquid filter element frame as claimed in claim 1 in which the collar has a number of inwardly extending support rails equal to the number of radially extending support ribs with the inner edges of the support rails being received neatly in a corner formed between each pair of adjacent support ribs.

3. A liquid filter element frame as claimed in claim 1 in which the support rails are flat in general construction with a tapered inner edge for neat accommodation in the corner between an associated pair of support ribs.

4. A liquid filter element frame as claimed in claim 1 in which the support rails extend downwards beyond the operatively lower end of the collar to form outer edges to lower ends of the support rails.

5. A liquid filter element frame as claimed in claim 4 in which the outer edges of the lower ends of the support rails curve inwards towards a center thereof.

6. A liquid filter element frame as claimed in claim 1 in which the operatively upper end of the collar has an integral outwardly directed support flange.

7. A liquid filter element frame as claimed in claim 1 in which the elongate injection molded body consists of a series of collinear injection molded units each having an integral support ring interconnecting the outer edges of the support ribs at the operatively lower end thereof and an operatively upper end that, in the case of all but an uppermost molded unit, receives a lower edge of the support ring of a superjacent unit.

8. A liquid filter element frame as claimed in claim 7 in which the upper end of the operatively uppermost molded unit receives the collar with its integral support rails.

9. A liquid filter element frame as claimed in claim 1 in which the collar is bonded to the frame by means selected from ultrasonic welding, solvent welding and adhesive combined with a tight fit of the collar on the frame.

10. A liquid filter including filter elements having frames as claimed in claim 1.

* * * * *